(12) United States Patent
Hieber et al.

(10) Patent No.: US 6,743,162 B2
(45) Date of Patent: Jun. 1, 2004

(54) APPARATUS AND METHOD FOR FOLDING A GAS BAG

(75) Inventors: Wolfgang Hieber, Heubach-Buch (DE); Jürgen Berger, Mutlangen (DE); Wilfried Strnad, Mutlangen (DE); Jürgen Heigl, Böbingen (DE); Karl Kienzle, Schwäbisch Gmünd (DE); Philipp Ritter, Schwäbisch Gmünd (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 66 days.

(21) Appl. No.: 09/879,723

(22) Filed: Jun. 12, 2001

(65) Prior Publication Data

US 2002/0052285 A1 May 2, 2002

(30) Foreign Application Priority Data

Jun. 13, 2000 (DE) .......................................... 100 29 056
Apr. 11, 2001 (DE) .......................................... 101 18 081

(51) Int. Cl.[7] ................................................. B31B 1/50
(52) U.S. Cl. ........................................ 493/457; 493/405
(58) Field of Search ................................. 493/405, 429, 493/433, 437, 448, 451, 457; 280/728.1, 743.1

(56) References Cited

U.S. PATENT DOCUMENTS

| | | | |
|---|---|---|---|
| 2,216,655 A | 10/1940 | Smith et al. | |
| 5,162,035 A | * 11/1992 | Baker | 493/405 |
| 5,360,387 A | * 11/1994 | Baker | 493/405 |
| 5,375,393 A | * 12/1994 | Baker et al. | 53/429 |
| 5,471,817 A | 12/1995 | Baker et al. | |
| 5,493,846 A | * 2/1996 | Baker et al. | 53/429 |
| 5,669,204 A | 9/1997 | Blaisdell | |
| 5,746,690 A | 5/1998 | Humbarger et al. | |
| 5,755,078 A | 5/1998 | Hurtig, Jr. et al. | |

FOREIGN PATENT DOCUMENTS

| | | |
|---|---|---|
| DE | 29516426 U1 | 1/1996 |
| DE | 19714174 A1 | 9/1998 |
| GB | 2315050 A | 1/1998 |
| GB | 2358837 A | 8/2001 |
| WO | WO 01/56840 A1 | 8/2001 |

* cited by examiner

Primary Examiner—Scott A. Smith
Assistant Examiner—Nathaniel Chukwurah
(74) Attorney, Agent, or Firm—Tarolli, Sundheim, Covell & Tummino L.L.P.

(57) ABSTRACT

A machine for folding a side gas bag for a vehicle occupant restraint system comprises a guide channel in which a gas bag to be folded can be disposed, and first and second folding tongues. The folding tongues have teeth and the guide channel has a first side part and a second side part in each of which several recesses are provided. The teeth of the folding tongues are able to engage into the recesses.

17 Claims, 5 Drawing Sheets

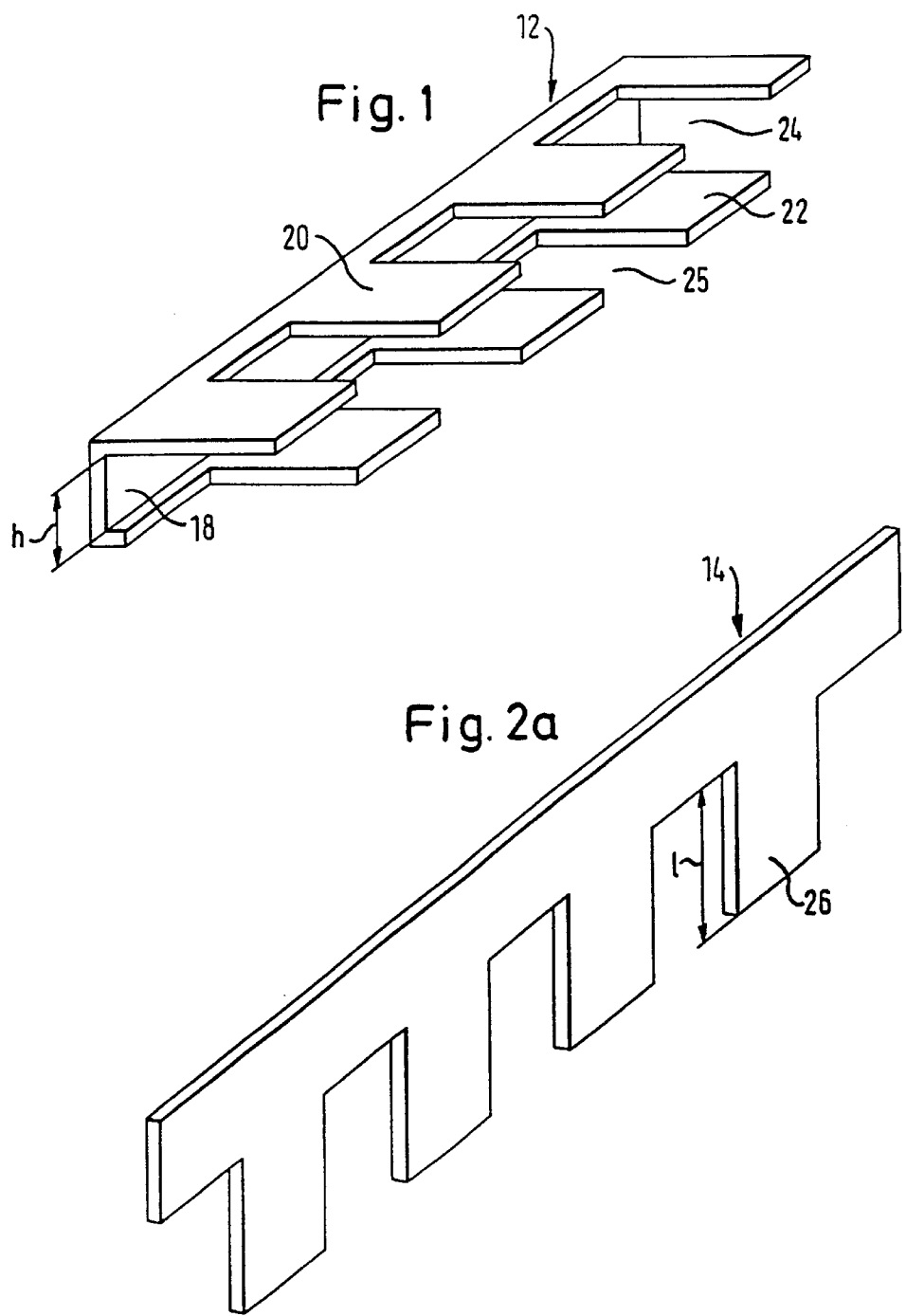

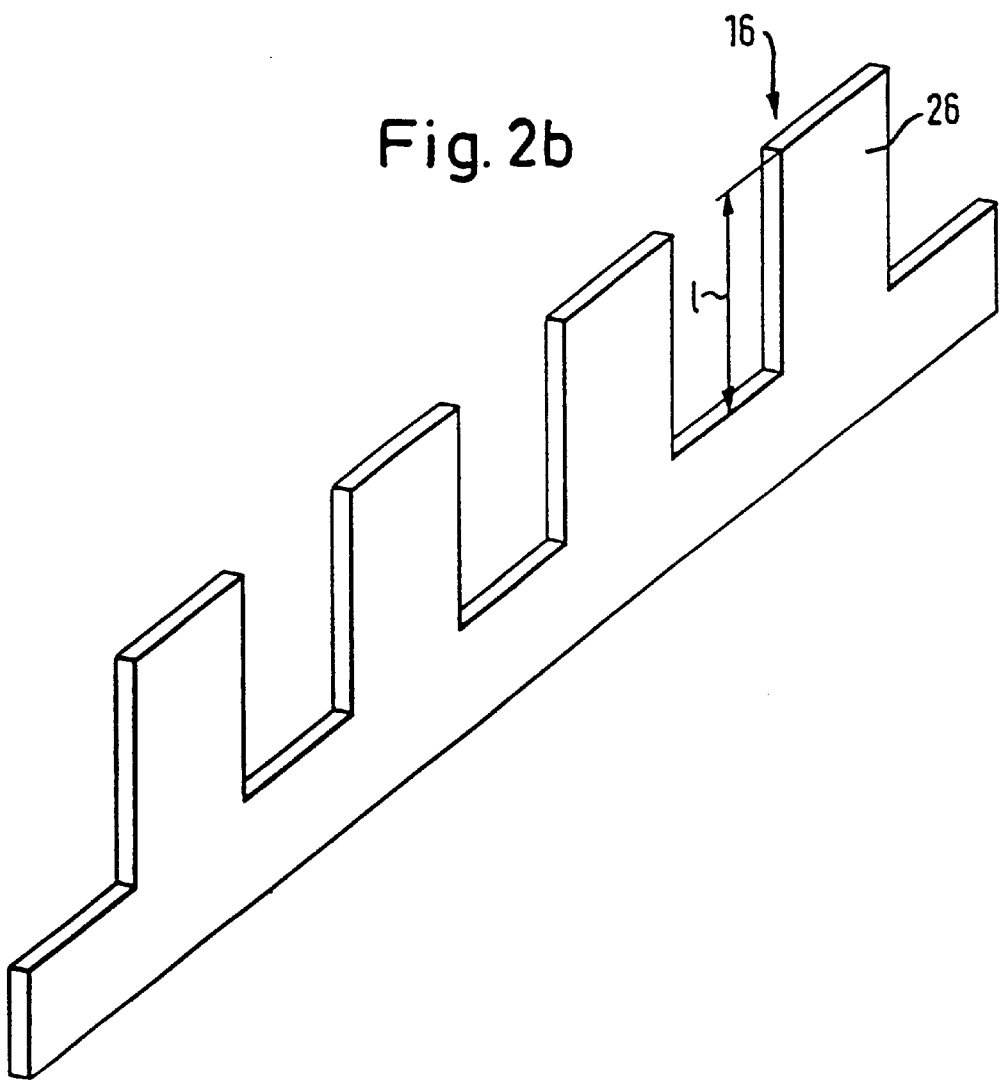

APPARATUS AND METHOD FOR FOLDING A GAS BAG

FIELD OF THE INVENTION

Figure 3A:
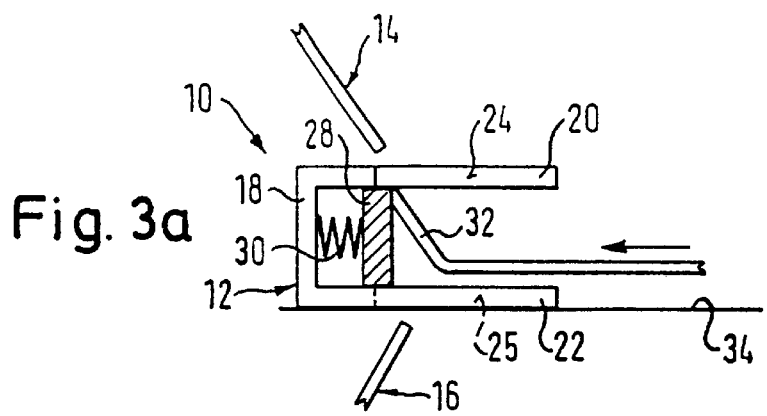

The invention relates to an apparatus for folding a gas bag, in particular a side gas bag for a vehicle occupant restraint system, and a method for folding a gas bag using such an apparatus.

BACKGROUND OF THE INVENTION

Prior to their use gas bags for vehicle occupant restraint systems are usually accommodated in folded form in a housing. The folding is designed such that, on the one hand, the gas bag can be folded in the smallest possible space since the space available is usually limited and, on the other, in the case of restraint the gas bag can be unfolded rapidly and fully when gas flows into it. Because of the precision required for this purpose the folding is frequently work done by hand. Therefore, there is a demand for apparatus and methods which accelerate the folding of a gas bag and, if possible, permit automation.

A method for folding a gas bag is known from DE 197 54 078 A1, in which a gas bag is laid in folds by means of disk pairs successively arranged one after the other, which folds are pushed when the introduction of the disks is terminated. Therefore, as many disks are required as folds are provided. The disks are arranged at a certain distance from one another, which is greater than the distance of the folds in the compressed state in the gas bag housing. The necessary step of pushing together and compressing the folds involves the danger that the precision of folding is reduced.

BRIEF SUMMARY OF THE INVENTION

It is the object of the invention to provide an apparatus and a method for folding a gas bag, by which a gas bag can be folded easily and with precision.

This is achieved in an apparatus for folding a side gas bag for a vehicle occupant restraint system, with a guide channel in which a gas bag to be folded can be disposed, and first and second folding tongues. The folding tongues have teeth and the guide channel has a first side part and a second side part in each of which several recesses are provided. The teeth of the folding tongues are able to engage into the recesses. In this connection, the guide channel which can be made substantially U-shaped serves as a mount for the folds of the gas bag. The gas bag can be folded by the folding tongues, the teeth of which engage the recesses of the side parts. Because of the possibility of moving the teeth of the folding tongues into the recesses of the side parts, the folds in the guide channel can be compressed. Since only two folding tongues are required, the apparatus can be realized simply and in cost-effective manner.

Preferably the first side part extends parallel to the second side part.

The two folding tongues may engage into the guide channel from opposite directions. Preferably, the recesses of the first side part and the recesses of the second side part are arranged staggered.

Advantageously a stop is provided at one end in the guide channel, against which stop the gas bag laid in folds can be pressed for maintaining the folding. To reduce the strain acting on the gas bag, the stop can be biased by a spring.

It is possible to provide a table on which the gas bag to be folded is placed.

The gas bag has a width and preferably the folding tongues extend not over the entire width of the gas bag. This is advantageous in that a gas bag can be provided with e.g. tensioning straps attached to a narrow side of the gas bag before folding. So, the tensioning straps do not come into contact with the folding tongues during the folding due to their reduced width and so cannot be entangled with the folding tongues.

The object of the invention is also achieved with a method for folding a gas bag using an apparatus comprising a guide channel in which a gas bag to be folded can be disposed, and first and second folding tongues. The folding tongues have teeth and the guide channel has a first side part and a second side part in each of which several recesses are provided. The teeth of the folding tongues are able to engage into the recesses. The gas bag is inserted with one end into the guide channel. Alternately the teeth of the first folding tongue engaging the recesses of the first side part and the teeth of the second folding tongue engaging the recesses of the second side part, each of the tongues laying one fold in the gas bag. Each of the folding tongues pushes the fold of the gas bag formed last by the folding tongue towards the fixed end of the gas bag and presses it against preceding folds of the gas bag. Each of the folding tongues after the step of pressing against remains in the guide channel to hold the folds of the gas bag together until the other folding tongue has formed a next fold. Since the folding tongues alternately engage the gas bag and form one fold each per folding tongue, whereupon the respective folding tongue can be pulled back, the number of two folding tongues is sufficient. Since the folding tongues press the just formed fold on the already existing folds, it is superfluous to subsequently push together and press on the folds, which adds to the precision of the folding. The first fold is preferably moved against a stop disposed in the guide channel, which forms a defined abutment surface.

The folding tongue which has laid the last fold can push, when the other folding tongue has been pulled back, all of the formerly laid folds of the gas bag towards the fixed end of the gas bag and can press the folds against it.

The heights of the folds can be determined by changing the insertion length of the teeth of the folding tongues into the guide channel.

Several gas bags can be folded one after another, the folded gas bags remaining in said apparatus while folding a gas bag. This method is particularly effective when the gas bags to be folded each are connected to at least one other gas bag before folding.

BRIEF DESCRIPTION OF A PREFERRED EMBODIMENT

Figure 3B:
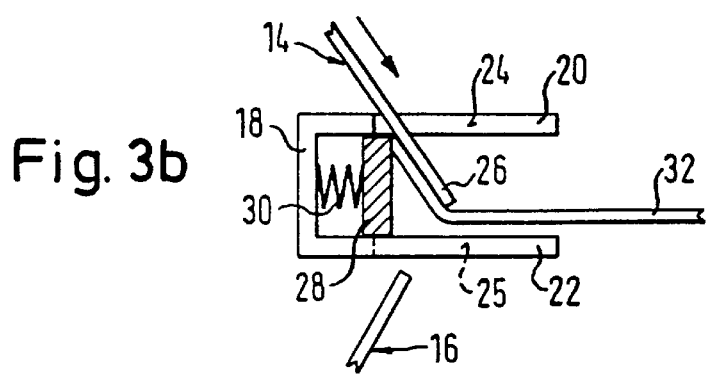
Figure 3C:
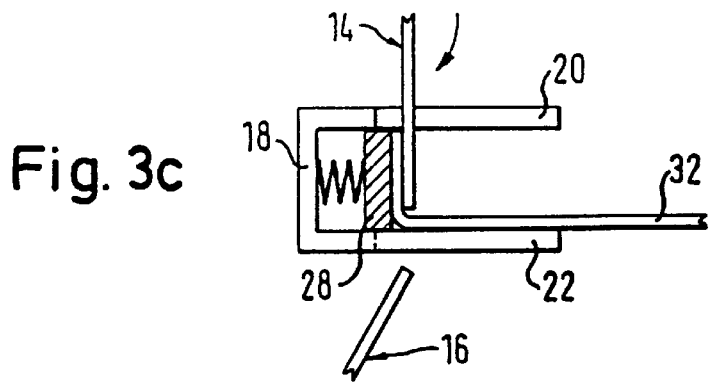
Figure 3D:
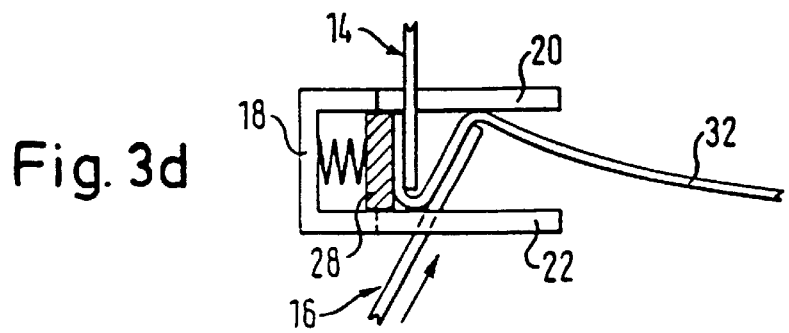
Figure 3E:
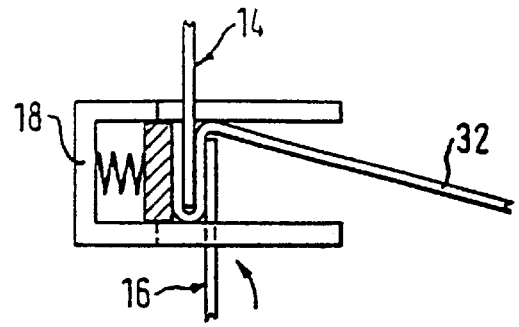
Figure 3F:
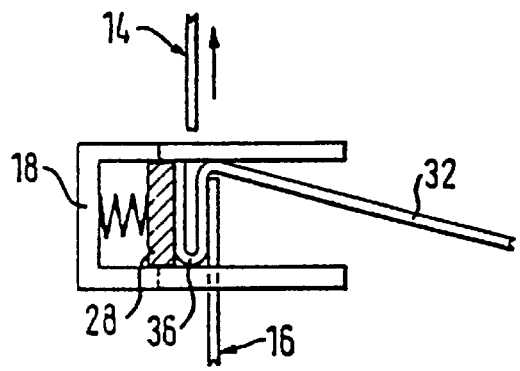
Figure 3G:
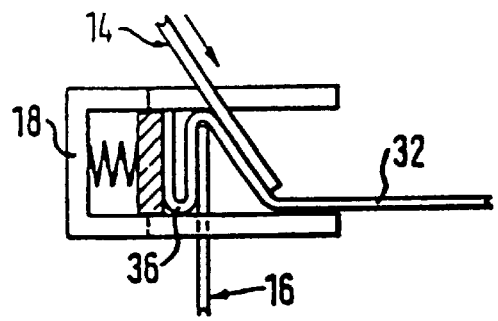
Figure 3H:
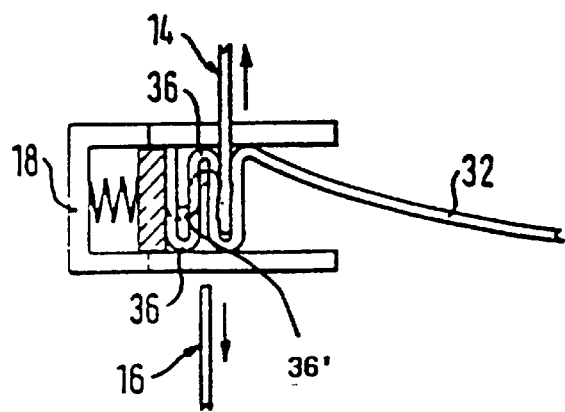
Figure 4A:
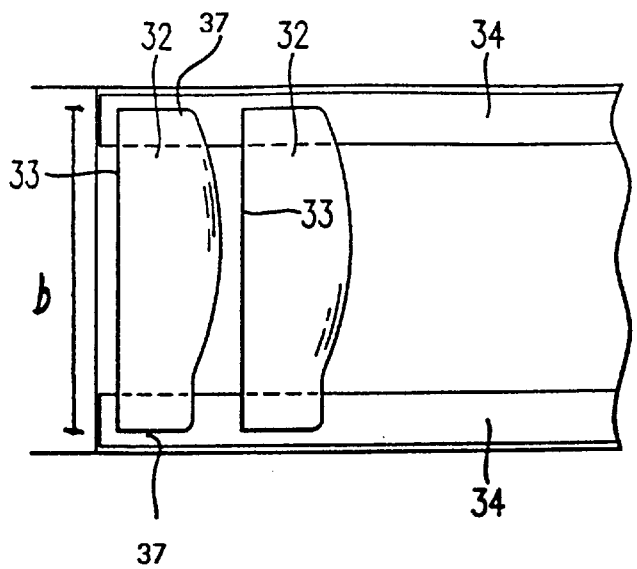
Figure 4B:
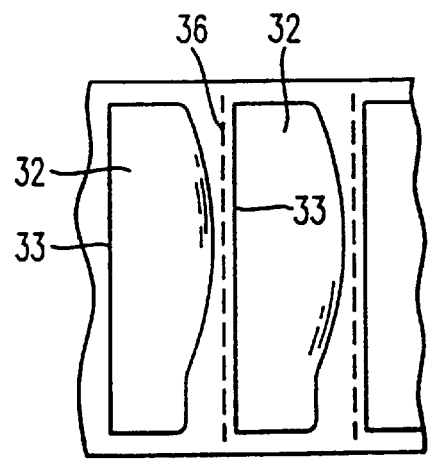
Figure 5:
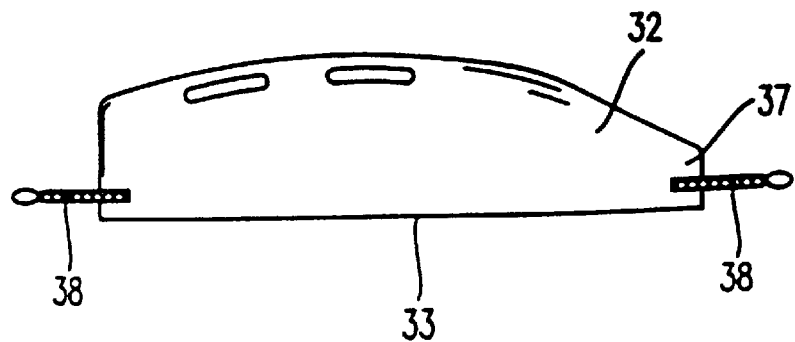

FIG. 1 shows the guide channel of a fold apparatus according to the invention in a perspective view, FIGS. 2a and 2b show first and second folding tongues of a folding apparatus according to the invention in a perspective view, FIGS. 3a to 3h show a representation of a method for folding a gas bag using a folding apparatus according to the invention, FIGS. 4a and 4b show two kinds of strips of connected gas bags, and FIG. 5 shows a conventional gas bag with tensioning straps attached thereto.

DETAILED DESCRIPTION OF A PREFERRED EMBODIMENT

FIGS. 1 and 2 show the main components of a folding apparatus 10, namely a guide channel 12 and a first folding tongue 14 as well as a second folding tongue 16. The guide channel 12 is approximately U-shaped and has a rear wall 18 on which a first side part 20 and a second side part 22 are disposed. The two side parts 20, 22 extend parallel to each other. The length of the rear wall 18 in a direction parallel to the side parts is approximately as large as the width of a side gas bag to be folded, whereas the length of the side parts perpendicular to the rear wall 18 must suffice to accommodate the gas bag as folded package.

The height $\underline{h}$ of the rear wall 18 between the two side parts 20, 22 corresponds to the maximum height of the folds of the gas bag and is preferably adjusted to the dimensions of a housing which is designated for subsequently accommodating the folded gas bag.

The side parts 20, 22 have recesses 24, 25 which are preferably arranged at equal distances from each other along the longitudinal direction of the rear wall 18, so that kind of double comb results. In this embodiment, the recesses 24 of the first side part 20 are arranged staggered as compared to the recesses 25 of the second side part 22.

As shown herein, the guide channel 12 can have a straight rear wall 18. However, the rear wall can also have a curved shape e.g. to be able to be adapted to the curvature of the top edge of a side gas bag.

The first folding tongue 14 and the second folding tongue 16 have teeth 26, each adapted to the recesses 24 of the side parts 20, 22 as regards their number, width and distance. The length $\underline{l}$ of teeth 26 is preferably greater than the height $\underline{h}$ of the rear part 18. The two folding tongues 14, 16 may have an identical shape.

Like the guide channel 12, the folding tongues 14, 16 may be straight or have a curved shape. In the second case, they are preferably adapted to the curvature of the guide channel as regards their curvature, so that the teeth can engage the recesses over the entire length thereof.

The folding apparatus 10 also has a stop 28 which is disposed near the rear wall 18 and is biased by a spring 30 in a manner facing away from the rear wall 18. The spring 30 serves for reducing the forces acting upon the gas bag 32.

The method for folding a gas bag proceeds as follows: A gas bag 32 is inserted with an end 33 into the guide channel 12 and mounted on stop 28, preferably in the vicinity of one of the side parts 20, 22, in the represented case in the vicinity of the upper first side part 20. The attachment is carried out preferably over the entire width $\underline{b}$ of the gas bag 32. The rest of the gas bag 32 is spread over e.g. a table 34. The two folding tongues 14, 16 are located outside the guide channel 12.

Then, one of the guide rulers, in this case the first guide ruler 14, is inserted from the top with its teeth 26 in the recesses 25 of the first side part 20, so that it engages the gas bag 32. The folding tongue 14 is preferably inserted in a slanting direction (see arrow in FIG. 3b) so as not to wear out the gas bag material. The folding tongue 14 is pressed down until it touches the lower second side part 22. By this, the gas bag 32 is easily pressed on the lower side part 22.

In the next step, the first folding tongue 14 is disposed perpendicularly and guided parallel to the side parts towards the rear wall 18 (FIG. 3c). By this movement the first fold of the gas bag 32 is pressed on stop 28. The first folding tongue 14 initially remains in this position.

Thereafter, the second folding tongue 16 enters the guide channel 12, in this case in a slanting direction from below, with its teeth 26 through the corresponding recesses 25 of the second side part 22, forces the gas bag held by the teeth of the first folding tongue 14 in the vicinity of the second side part 20 upwards towards the first side part 22 thus laying the next fold in the gas bag 32 (FIG. 3d).

Then, the second folding tongue 16 is disposed perpendicularly and is guided in a direction parallel to the side parts 20, 22 towards the rear wall 18, preferably until it abuts against the gas bag section held by the first folding tongue 14. Since the current folding is fixed in this way, the first folding tongue can in the next step (FIG. 3f) be pulled perpendicularly upwards out of the guide channel 12 and the second folding tongue 16 can be pushed towards the rear wall 18 until the new fold is pushed together. The second folding tongue 16 keeps the folds 36 pressed on stop 18.

The next step which is shown in FIG. 3g is a repetition of the step from FIG. 3b. Again, the first folding tongue 15 is inserted with its teeth 26 in a slanting fashion from the top through the recesses 24 in the guide channel 12, so that it engages gas bag 32 to lay the next fold. The folding tongue 14 is placed perpendicularly and the gas bag fold is pushed towards the second folding tongue 16. Only then will the second folding tongue 16 be pulled in this case downwards out of the guide channel 12, and the first folding tongue 14 pushes the newly formed fold onto the already existing folds and keeps them compressed.

This procedure is continued until the entire length of the gas bag 32 in the guide channel 12 is folded. In this connection, the gas bag 32 moves along the direction of arrow shown in FIG. 3a or can be entrained.

The height of the formed fold can be varied via the insertion length which the teeth 26 of the folding tongues 14, 16 are inserted in the guide channel 12. The maximum fold height is given by the height $\underline{h}$ of the rear wall 18 and is achieved when the folding tongue 14, 16 is inserted in the guide channel 12 to such an extent that it touches the more distant side part. If the folding tongue 14, 16 is e.g. inserted only up to half the height $\underline{h}$ of the rear wall 18 in the guide channel 12, a fold 36' will result which has half the height $\underline{h}$ of the rear wall 18 (schematically shown in FIG. 3h). In this way, the folding height of individual folds can be influenced during the folding step e.g. to be able to adapt the shape of the folded gas bag package to a certain housing shape. The upper and lower edges of the folds can be positioned as desired within the guide channel by varying the insertion length of the folding tongues.

As shown in FIGS. 3a to 3h, the apparatus can be used in a horizontal position, the gas bag being entrained horizontally, or also in a vertical position, in which case the gas bag can be entrained from above or below. In the second case, the folding tongues engage the guide channel from two opposite sides instead of from above and below.

The gas bag can also be inserted with a gas lance already attached thereto.

It is also possible to fold several gas bags in the apparatus one after the other, so that a number of gas bag packages is arranged in the guide channel when the folding is terminated. In this connection, the counterpressure required for pressing on the individual folds can be produced by the already folded gas bag packages.

The gas bags 32 to be folded can be connected to strips as shows in FIGS. 4a and 4b. An advantage lies in that several gas bags can be fed continuously to the apparatus in an automated process. The individual gas bag packages folded in the apparatus are separated from each other after being taken out from the apparatus.

Individual gas bags 32 can e.g. after cutting be glued to two transport strips 34 lying as far from each other as possible, forming a continuous gas bag strip.

The method is also advantageously for folding gas bags manufactured by a weaving method that are connected in a strip after manufacture. Preferably, between the individual gas bags 32, a separation marker 36 is placed, which serves as a point of reference for the positioning of the gas bag 32 and particularly its end 33 for the folding procedure or the following separation process. The separation marker 36 can be woven in or added subsequently. The separation marker 36 is preferably optically detected for the folding or separation process.

In an advantageous embodiment of the invention the folding tongues 14, 16 do not extend over the entire width b of the gas bag 32. Here, the width b is defined as the distance between narrow sides 37 of the gas bag. In the folding method using such an apparatus additional elements like tensioning straps 38 arranged at the narrow sides 37 of the gas bag can be prearranged at the gas bag before the folding process. As the tensioning straps 38 do not come into contact with the folding tongues 14, 16, the folding process cannot be disturbed by the tensioning straps 38. The relatively short sections of the gas bag not in contact with the folding tongues 14, 16 are folded together with the remainder of the gas bag 32 owing to the rigidity of the gas bag fabric.

What is claimed is:

1. An apparatus for folding a side gas bag for a vehicle occupant restraint system, comprising:
   a guide channel in which a gas bag to be folded can be disposed, and
   first and second comb-shaped folding tongues,
   each of said folding tongues having several teeth,
   said guide channel having a first and a second comb-shaped side part in each of which several recesses are provided,
   said folding tongues being moveable in a way that said teeth of said folding tongues engage into said recesses and form folds in said gas bag.

2. The apparatus according to claim 1, wherein said first side part extends parallel to said second side part.

3. The apparatus according to claim 1, wherein said two folding tongues engage into said guide channel from opposite directions.

4. The apparatus according to claim 1, wherein a stop is provided at an end in said guide channel, against which stop said gas bag laid in folds can be pressed for maintaining said folds.

5. The apparatus according to claim 4, wherein said stop is biased by a spring.

6. The apparatus according to claim 1, wherein a table is provided on which said gas bag to be folded is placed.

7. The apparatus according to claim 1, wherein said gas bag has a width, said folding tongues extending not over the entire width of said gas bag.

8. The apparatus according to claim 1, wherein each of said first and second comb-shaped folding tongues includes an elongated connecting portion connected to ends of said teeth, said teeth extending from said connecting portion, said teeth being spaced apart from each other along a length of said connecting portion.

9. A method for folding a gas bag comprising the following steps:
   a gas bag to be folded and having two ends is disposed with one of said ends in a guide channel, said guide channel having a first and a second comb-shaped side part in each of which several recesses are provided,
   said gas bag is alternately engaged by one of a first and a second folding tongues, said folding tongues having teeth able to engage into said recesses, said teeth of said first folding tongue engaging into said recesses of said first side part and said teeth of said second folding tongue engaging into said recesses of said second side part whereby each of said tongues lays one fold in said gas bag,
   said folding tongues alternately pushes a fold formed in said gas bag by said folding tongue towards said end of said gas bag and presses said fold against preceding folds of said gas bag,
   said folding tongue being held in said guide channel after having pushed a fold against preceding folds, whereby said folds of said gas bag being held together until said other folding tongue has formed a next fold.

10. The method according to claim 9, wherein said folding tongue which has formed a last of said folds holds all of said formed folds when the other of said folding tongues is pulled out of said guide channel.

11. The method according to claim 9, wherein a first of said folds is pressed against a stop provided in said guide channel.

12. The method according to claim 9, wherein several gas bags are folded one after another, the folded gas bags remaining in said apparatus while folding a gas bag.

13. The method according to claim 12, wherein gas bags to be folded each are connected to at least one other gas bag before folding.

14. An apparatus for folding a side gas bag for a vehicle occupant restraint system, comprising:
   a guide channel in which a gas bag to be folded can be disposed, and first and second folding tongues,
   said folding tongues having teeth,
   and said guide channel having a first side part and a second side part in each of which several recesses are provided,
   said teeth of said folding tongues being able to engage into said recesses,
   said recesses of said first side part and said recesses of said second side part being arranged staggered.

15. A method for folding a gas bag comprising the following steps:
   a gas bag to be folded and having two ends is disposed with one of said ends in a guide channel, said guide channel having a first side part and a second side part in each of which several recesses are provided,
   said gas bag is alternately engaged by one of a first and a second folding tongues, said folding tongues having teeth able to engage into said recesses, said teeth of said first folding tongue engaging into said recesses of said first side part and said teeth of said second folding tongue engaging into said recesses of said second side part whereby each of said tongues lays one fold in said gas bag,
   said folding tongues alternately pushes a fold formed in said gas bag by said folding tongue towards said end of said gas bag and presses said fold against preceding folds of said gas bag,
   said folding tongue being held in said guide channel after having pushed a fold against preceding folds, whereby said folds of said gas bag being held together until said other folding tongue has formed a next fold,
   said gas bag to be folded having at least one narrow side, a tensioning strap being attached to said narrow side, the tensioning strap not coming into contact with the folding tongues during folding.

16. An apparatus for folding a side gas bag for a vehicle occupant restraint system comprising:

a guide channel in which a gas bag to be folded can be disposed, and first and second comb-shaped folding tongues, each of said folding tongues having teeth, said guide channel having a first and a second comb-shaped side part in each of which several recesses are provided, said recesses of said first part and said recesses of said second part being arranged staggered, and said folding tongues being arranged moveable in a way that said teeth of said folding tongues engage into said recesses and form folds in said gas bag.

17. A method for folding a gas bag comprising the following steps:

a gas bag to be folded and having two ends is disposed with one of said ends in a guide channel, said guide channel having a first and a second comb-shaped side part in each of which several recesses are provided, said gas bag is alternately engaged by one of a first and a second folding tongues, said folding tongues having teeth able to engage into said recesses, said teeth of said first folding tongue engaging into said recesses of said first side part and said teeth of said second folding tongue engaging into said recesses of said second side part whereby each of said tongues lays one fold in said gas bag, said folding tongues alternately pushes a fold formed in said gas bag by said folding tongue towards said end of said gas bag and presses said fold against preceding folds of said gas bag, said folding tongue being held in said guide channel after having pushed a fold against preceding folds, whereby said folds of said gas bag being held together until said other folding tongue has formed a next fold, wherein an insertion length of said teeth of said folding tongues in said guide channel is changed whereby a height of said folds can be determined.

* * * * *

UNITED STATES PATENT AND TRADEMARK OFFICE
CERTIFICATE OF CORRECTION

PATENT NO.   : 6,743,162 B2
DATED        : June 1, 2004
INVENTOR(S)  : Wolfgang Hieber et al.

It is certified that error appears in the above-identified patent and that said Letters Patent is hereby corrected as shown below:

Column 5,
Line 34, after "provided," insert -- said recesses of each side part defining a plane, --.
Line 36, after "said" (1st occurrence) insert -- respective --.
Line 36, after "tongues" insert -- cross said plane of said recesses of said respective side parts and --.
Line 37, after "recesses" insert -- and penetrate into said guide channel --.
Line 65, after "provided," insert -- said recesses of each side part defining a plane, --.

Column 6,
Lines 2, after "tongue" insert -- crossing said plane of said recesses of said first side part and --.
Line 3, after "and" insert -- penetrating into said guide channel and --.
Line 4, after "tongue" insert -- crossing said plane of said recess of said second side apart and --.
Line 5, after "part" insert -- and penetrating into said guide channel --.

Signed and Sealed this

Twenty-eighth Day of September, 2004

JON W. DUDAS
*Director of the United States Patent and Trademark Office*